3,580,975
VINYL HALIDE GRAFT POLYMERS
Leo E. Rademacher, Springfield, Mass., assignor to
Monsanto Company, St. Louis, Mo.
No Drawing. Filed Sept. 21, 1967, Ser. No. 669,372
Int. Cl. C08f 15/00
U.S. Cl. 260—878
13 Claims

ABSTRACT OF THE DISCLOSURE

There is disclosed a process for preparing novel graft polymers of a vinyl halide and long-chain aliphatic vinyl compound on a rubbery olefin polymer. In accordance with the process, an aqueous dispersion is formed of a rubbery olefin polymer and a monomer formulation containing vinyl halide and a copolymerizable long-chain aliphatic vinyl monomer. Polymerization is effected in the resulting dispersion for a period of time sufficient to polymerize at least a substantial portion of the vinyl halide and aliphatic vinyl monomer present therein and produce grafting of at least a portion of the rubbery olefin polymer after which the copolymeric product is recovered. In the preferred process the faster reacting monomer is continuously added so as to maintain a higher ratio of the slower acting monomer in the dispersion.

BACKGROUND OF THE INVENTION

Although vinyl halide polymers which are currently available exhibit many desirable properties, they are oftentimes rather difficult to process and may produce articles which are rough and brittle without modification. To overcome these deficiencies, various lubricants or plasticizers have been used in the past with varying degrees of success.

In order to provide the desired plasticity or lubricity, so-called "external plasticizers" have often been used. These are materials which are incorporated into the polymer after it is formed, such as the waxes, etc., and they are generally quite incompatible with the base resin. This factor imposes a limitation upon the maximum amount of such an additive that can be used, since inclusion of the amounts necessary to provide desirable levels of lubricity or plasticity results in a great tendency for exudation or plating-out of the material. In addition, the external plasticizers are frequently detrimental to clarity and chemical resistance of the resins in which they are utilized. Accordingly, the use of such additives has resulted in other difficulties, particularly when used in amounts greater than about 1 percent, due largely to the plating-out phenomenon.

Various interpolymers have been suggested for improving the plasticity of vinyl halide polymers, and graft copolymers of vinyl halide polymers on a rubbery olefin polymer have been employed to obtain higher impact strengths and other desirable properties. However, such graft copolymers tend to evidence undesirable levels of "puff-up" in extruded materials, i.e., swelling to larger than extruded dimensions. Moreover, such graft copolymers have still not provided the desired degree of lubricity for many applications.

Accordingly, it is an object of the present invention to provide vinyl halide graft polymers which exhibit smoothness and uniformity in molded and extruded structures and highly desirable flow properties.

It is also an object to provide modified vinyl halide graft polymers wherein there is no tendency for exudation or plating out of lubricating additives and wherein reductions in glass transition temperatures and tensile properties are minimized.

Another object is to provide novel processes wherein the foregoing objects are attained conveniently, economically and without substantially increasing the time required for reaction cycles over those necessary for the production of unmodified vinyl halide graft polymers.

SUMMARY OF THE INVENTION

It has now been found that the foregoing and related objects can be readily obtained in a process wherein there is formed an aqueous dispersion of a rubbery olefin polymer and a monomer formulation containing a vinyl halide monomer and at least one long-chain aliphatic vinyl monomer copolymerizable with said vinyl halide and having 8 to 22 carbon atoms in the aliphatic chain. The monomer formulation contains at least 70 percent by weight of vinyl halide monomer, 1.0 to 10.0 percent by weight of the long-chain aliphatic vinyl monomer and up to 30 percent of ethylenically unsaturated monomer copolymerizable with the vinyl halide monomer. The rubbery olefin polymer comprises at least 4.0 and not more than about 100.0 percent by weight of the monomer formulation and characterized by being subject to grafting under the polymerization conditions. The aqueous dispersion is subjected to polymerization conditions for a period of time sufficient to polymerize at least a substantial portion of the polymerizable monomer present therein and to graft a polymer of vinyl halide and a long-chain aliphatic vinyl monomer onto at least a portion of the rubbery olefin polymer. After polymerization has proceeded to the desired degree of conversion, the resulting polymeric product is recovered and includes at least a substantial amount of a graft copolymer of the two monomers on the rubbery olefin polymer.

The resultant polymeric products are tough, rigid materials which offer significant advantages over unmodified vinyl halide graft polymers. They can be molded, extruded or injection molded with ease into smooth, tough, rigid articles whereas the unmodified polymers are difficult to process and tend to give tough, brittle articles. The polymeric product of the present invention can be processed without additional lubricants wherein unmodified vinyl halide graft polymers require the addition of lubricants for proper operation which oftentimes result in exudation, poor chemical resistance and reduced clarity.

DESCRIPTION OF THE PREFERRED EMBODIMENTS

The monomer formulation

Although various vinyl halides may be employed in the present invention including vinyl fluoride and vinyl bromide, the preferred vinyl halide is vinyl chloride which most desirably provides the entire vinyl halide fraction or at least the predominant portion thereof. In addition to the vinyl halide and the long-chain aliphatic vinyl monomer, the monomer formulation may include up to 25.0 percent by weight of other ethylenically unsaturated monomers copolymerizable with the vinyl halide and long-chain aliphatic vinyl monomer. Preferably, such other ethylenically unsaturated monomers comprise less than 15.0 percent by weight of the monomer formulation and desirable compounds may be provided by monomer formulation which consists substantially entirely of the vinyl halide and long-chain aliphatic vinyl monomers. Exemplary of such ethylenically unsaturated copolymerizable monomers are vinyl esters of organic acids such as vinyl acetate, vinylidene halides such as vinylidene chloride, unsaturated nitriles such as acrylonitrile, acrylates such as methyl methacrylate, maleates, fumarates and the like.

The aliphatic vinyl monomer incorporates a long-chain aliphatic component and a vinyl component with an intermediate linkage which activates the vinyl group, namely ether, ester or amide linkages. As used herein, the term "long-chain aliphatic vinyl monomer" refers to esters, amides and ethers having a vinyl component and a long-chain aliphatic component.

To achieve the desired lubricity in the ultimate products, it has been found necessary that the copolymerizable monomer possess a long-chain aliphatic radical which is essentially incompatible with a vinyl halide polymer matrix, i.e., one having 8 to 22 carbon atoms and preferably 12 to 18 carbon atoms. The aliphatic radical should have at least 8 carbon atoms in the chain since it is found that the degree of lubricity desired is not achieved when the radical is shorter. On the other hand, aliphatic chains containing more than 18 carbon atoms tend to be less desirable since the longer chain compounds frequently retard the rate of reaction although compounds containing aliphatic radicals having up to 22 carbon atoms are also useful in some circumstances.

The vinyl component should not include an aromatic ring directly attached thereto since such a ring structure is known to retard the polymerization rate of vinyl halides. However, various vinyl compounds can be used to prepare the long-chain aliphatic vinyl monomers including vinyl alcohol for reaction with an aliphatic acid to form an ester.

Exemplary of the compounds suitable for use as the monomer are the alkyl vinyl ethers such as lauryl vinyl ether, myristyl vinyl ether, cetyl vinyl ether, stearyl vinyl ethers, etc.; the vinyl esters of long-chain acids such as caprylic, capric, lauric, myristic, palmitic, stearic, arachidic, behenic, etc., or aliphatic esters of vinyl acids such as acrylic. Aliphatic acid amides which are N-substituted by vinyl radicals or conversely, vinyl amides which are N-substituted by aliphatic radicals are also among the suitable aliphatic vinyl monomers.

The amount of such monomer that is employed will generally be about 1.0 to 10.0 percent and preferably 1.5 to 5.0 percent based upon the weight of monomer formulation employed in the dispersion. It is generally found that use of an amount of long-chain aliphatic vinyl monomer less than about 1.0 percent is quite ineffective. On the other hand, using more than 10.0 percent can result in overlubrication and a relatively undesirable product.

Either a single long-chain aliphatic vinyl monomer or a mixture of two or more such monomers can be used. In some instances it is preferable to utilize a combination of such monomers since it is found that, although the vinyl halide and a single long-chain aliphatic vinyl monomer may be present simultaneously, the distribution thereof is not homogenous due to differences in the reactivity thereof. By using two such modifying monomers, one of which has a faster reaction rate and the other of which has a slower reaction rate than the vinyl halide monomer, a relatively uniform distribution of vinyl halide and modifying monomer can be produced in the polymer. The rubbery olefin polymers are customarily the olefinic materials such as polyethylene, chlorinated polyethylene, chlorosulfonated polyethylene, ethylene/acrylate copolymers, ethylene/propylene copolymers, ethylene/propylene/diene terpolymers, ethylene/vinyl acetate copolymers, etc. Unsaturated rubbers such as dienes are normally undesirable because of the adverse effect upon polymerization rate. If so desired, mixtures of such rubbers may be employed. Although the amount of the rubbery olefin polymer may comprise from 4.0 to 100.0 percent by weight of the monomer formulation, generally a practical upper limit is about 60.0 percent by weight of the monomer formulation because of the reduction in grafting efficiency which occurs thereabove and the increase in the size of the beads where a suspension polymerization is employed.

Polymerization process

Although an emulsion may be utilized for the aqueous dispersion in accordance with the present invention, processes in which the polymerization reaction is effected in suspension are preferred. The amount of water which is charged to the reaction vessel is generally that which will result in the maximum utilization of reactor volume consistent with a sufficiently low slurry viscosity to maintain adequate heat transfer, etc. Accordingly, the amount of water will generally be about 65 to 250 parts by weight per 100 parts of reactants charged.

In the preferred suspension polymerization process, the water, rubbery olefin polymer, and suspending agent are charged in an agitated vessel which is then sealed and purged of oxygen, such as with a vacuum and/or an inert gas. Thereafter a polymerizable monomer formulation is dispersed in the water and a suitable initiator is added. If necessary, the dispersion is then heated to polymerization temperatures, usually about 25 to 100° centigrade and preferably 40 to 65° centigrade, to polymerize about 40.0 percent, and preferably 85 to 98.0 percent, of the polymerizable monomers present in the formulation. This polymerization usually requires two to twenty hours and is preferably completed in about four to twelve hours. The time required to carry the reaction to higher levels of completion is generally not warranted when all factors are considered. Any residual monomer is then removed and the resin particles recovered in a conventional manner, depending upon the aqueous polymerization technique employed.

The polymerization reaction may be initiated and accelerated by heat, irradiation, and/or polymerization initiators. Those which have been found to be particularly useful are the monomer-soluble organic peroxides such as benzoylperoxide, lauroyl peroxide, 2,4-dichlorobenzoyl peroxide, acetyl peroxide acetyl benzoyl peroxide, acetyl cyclohexane sulfonyl peroxide; alkyl percarbonates; perborates; azo compounds; and mixtures thereof. When the reaction is to be effected in emulsion, the well-known "redox" type initiators advantageously may be used. Mixtures, for example, of sodium bisulfite and potassium persulfate are suitable in conjunction with a small amount of an activating metal ion and optionally a bicarbonate buffer.

The quantity of initiator used will be varied depending upon its activity, the quantity of monomer and economical consideration. Normally the amount of initiator will be chosen so as to give an overall rate of reaction of less than ten hours. When the initiator is of the peroxide type, an amount of about 0.01 to 3.0 percent, preferably 0.05 to 1.0 percent based upon the total weight of polymerizable monomers present in the reaction, will be used.

The reaction is desirably carried out in the presence of chain regulators such as chlorinated hydrocarbons, alcohols, aldehydes, etc. Suitable suspending agents that can be used are hydrophilic, macromolecular, natural or synthetic surfactants, and mixtures thereof, including polyvinyl alcohol and polyacrylates. Exemplary of the emulsifying agents which can be employed are the akyl sulfates such as sodium lauryl sulfate.

Dispersion of the rubbery olefin polymer should be substantially uniform to obtain desirable properties, preferably by initially dispersing it in vinyl halide monomer prior to addition to the aqueous medium. When an emulsion process is employed, the rubbery olefin polymer is desirably in the form of a latex prior to addition to the aqueous medium.

Whatever technique is used, it is highly desirable to control the rate of reaction of the long-chain aliphatic vinyl monomer so that the interpolymer with the vinyl halide is of uniform composition. Thus, the faster reacting monomer should be added over a period of time of the polymerization reaction to maintain a higher ratio of the slower reacting monomer and encourage the formulation of the interpolymer of desired composition. For example, when the reacting monomers are vinyl chloride and cetyl vinyl ether, about 50 percent of the vinyl chloride is added initially with all the cetyl vinyl ether and the remaining vinyl chloride is added in increments or continuously over at least half of the reaction cycle.

Another manner of encouraging the formation of an interpolymer of desired composition where the long-chain aliphatic vinyl monomer is slower reacting than the vinyl halide is to include a third monomer which is faster reacting than the vinyl halide. For example, stearyl methacrylate used in combination with the cetyl vinyl ether and vinyl chloride produce a desirably uniform composition.

In the copending application Ser. No. 669,386 of Massimo Baer, filed concurrently herewith entitled Vinyl Halide Polymers, but now abandoned and refiled into a continuation-in-part application Ser. No. 37,881, filed May 15, 1970, both applications being assigned to the assignee of the present invention, there is disclosed a process for making polymeric products including graft polymers on a rubbery olefin polymer wherein the polymer of vinyl halide and long-chain aliphatic vinyl monomer is in the shell of the particulate polymer. Although the shell polymer concentrates the lubricating monomer at the surface of the polymer particle, distribution throughout the polymeric superstrate as taught in the present invention offers the advantage of decreasing the melting point of the polymeric superstrate so that the crystalline melting point may be below the processing temperature. This results in lower melt viscosity since the polymeric material is completely molten and enables reduction in the puff-up ratio and improvement in the surface quality of the extruded or molded products.

Other components in the polymeric product

The compositions of the invention may additionally be admixed with additives such as stabilizers, fillers, colorants, processing aids, etc. Furthermore, although the present compositions are generally fully lubricated by the use of the long-chain aliphatic vinyl monomers, it is within the scope of the invention to include other lubricants or processing aids. For example, small amounts of methyl methacrylate polymers, chlorinated paraffins, etc. may be included. The compositions can also be reinforced with inorganic materials, such as asbestos fibers.

Although the modified polymers of the present invention can be employed alone, they can be blended with other polymeric materials. For example, it may be desirable to admix a quantity of the modified vinyl halide composition of the invention with a quantity of preformed vinyl halide homopolymer or copolymer. In such a case, the components may be admixed in substantially any proportion; however, it is apparent that if too little of the instant polymeric product is utilized, the advantageous effects thereof will not be realized. Accordingly, the polymeric products of the present invention should be used in an amount of at least 25 percent by weight of such a mixture.

SPECIFIC EXAMPLES

Exemplary of the efficacy of the present invention are the following specific examples wherein all parts and percentages are on a weight basis unless otherwise indicated.

EXAMPLE 1

To a reaction vessel is added 170 parts water, 4.0 part finely divided polyethylene, 0.5 part methyl cellulose suspending agent, 0.34 part lauroyl peroxide, 0.2 part sorbitan monolaurate as a secondary suspending agent. The reactor is sealed and purged of air by boiling, after which 2.0 parts of cetyl vinyl ether and 94.0 parts vinyl chloride are introduced. The reactor is heated at 58° centigrade for about nine hours after which the unreacted monomer is vented off. The polymeric product is recovered, washed and dried.

The prodcct is a fine bead of about 200 mesh average diameter. By extracting with cyclohexane, it is determined 4.8 percent is soluble consisting of unreacted cetyl vinyl ether and ungrafted polyethylene. By extracting with hydrofuran, it is determined that 93.1 percent is soluble indicating that the remaining 2.0 percent is graft copolymer.

Upon mill rolling at 165° centigrade, the material is observed to fuse easily and gives a soft, good flowing melt. The Izod impact strength ranges from 2 to 9 foot pounds per inch notch at 23° centigrade. Tensile properties are found to be 6840 p.s.i. and 3.0 percent elongation at yield, 5310 p.s.i. and 16.0 percent elongation at fail, and the modules $3.8 \times 10^5$ p.s.i. It is seen that this is a good handling polymer without the addition of any external lubricants.

A similar graft polymer made without the cetyl vinyl ether is found to be extremely stiff and very crumbly when milled under similar conditions. The surface of the milled sheet is very dull and wavy as compared with the smooth, shiny surface of the milled sheet prepared in accordance with the present invention.

EXAMPLE 2

A reaction vessel is purged with nitrogen and charged with 200 parts of water, 0.3 part of methyl cellulose as a suspending agent, 0.2 part of lauroyl peroxide as a catalyst, 4 parts of finely divided polyethylene, 1 part of cetyl vinyl ether and 95 parts of vinyl chloride. The reaction vessel is then heated with agitation of the suspension for a period of 7 hours at about 55° centigrade to effect conversion of about 92 percent of the vinyl chloride. The unreacted monomers are then vented and the polymeric product is recovered in the form of small beads.

Upon mill rolling at 170° centigrade, the polymeric product is found to fuse slowly and to be soft and relatively crumbly. The molded products are found to have low haze and to be free from exudation. The heat distortion temperature of the polymer at 264 p.s.i. is 73.5° centigrade. Molded specimens are found to have an Izod impact value of 2.10 foot pounds per inch of notch at 23° centigrade. Tensile test values are 6680 p.s.i. and 3.1 percent elongation at yield, 5070 p.s.i. and 16 percent elongation at fail, and modulus of elasticity $3.80 \times 10^5$ p.s.i.

EXAMPLE 3

The procedure of Example 2 is substantially repeated using 2 parts of cetyl vinyl ether and 98 parts vinyl chloride with 4 parts of polyethylene. Upon milling at 170° centigrade, the polymeric product is found to fuse at a faster rate and to be soft and relatively crumbly. The molded products have low haze and exhibit no tendency for exudation.

The heat distortion temperature at 264 p.s.i. is 70.5° centigrade and the Izod impact value at 23° centigrade is 2.60 foot pounds per inch of notch. The tensile values are 6580 p.s.i. and 3.0 percent elongation at yield, 5000 p.s.i. and 27 percent elongation at fail and a modulus of elasticity at $3.80 \times 10^5$ p.s.i.

EXAMPLE 4

The procedure of Example 2 is substantially repeated using 4 parts of cetyl vinyl ether and 96 parts vinyl chloride with 4 parts polyethylene, and continuing polymerization to 88 percent conversion of monomers. The polymeric product has a heat distortion temperature at 264 p.s.i. of 70.0° centigrade and an Izod impact value of 5.7 foot pounds per inch of notch at 23° centigrade. Upon milling at 170° centigrade, the polymer is found to be soft and provide good flow. Molded specimens have low haze and exhibit no exudation. Tensile values of 6080 p.s.i. and 2.5 percent elongation at yield, 4470 p.s.i. and 18 percent elongation at fail and a modulus of $3.52 \times 10^5$ p.s.i.

EXAMPLE 5

The procedure of Example 3 is substantially repeated substituting an ethylene-propylene terpolymer for the polyethylene. The polymeric product has a heat distortion temperature of 71.0° centigrade at 264 p.s.i. and an Izod impact value of 13.4 foot pounds per inch of notch at 23° centigrade.

Milling at 170° centigrade indicates the polymer to be soft and to flow well. The molded products exhibit haze but no tendency for exudation. The tensile values are 5980 p.s.i. and 2.8 percent elongation at yield, 4500 p.s.i. and 16 percent elongation at fail and a modulus of $3.53 \times 10^5$ p.s.i.

Thus, it can be seen that the present invention provides a polymeric product which processes with greater ease and enables the use of lower processing temperatures so as to obtain better surface quality. As the amount of the long-chain aliphatic vinyl monomer in the polymeric superstrate is increased, the crystalline melting point is decreased so that the processing temperature may equal or exceed the melting point for optimum flow or melt viscosity.

What is claimed is:

1. In a process for forming a graft copolymer of a vinyl halide polymer on a rubbery olefin polymer, the steps comprising: forming an aqueous dispersion of a rubbery olefin polymer selected from the group consisting of polyethylene, chlorinated polyethylene, chlorosulfonated polyethylene, ethylene/vinyl acetate copolymers, ethylene/acrylate copolymers, ethylene/propylene copolymers, ethylene/propylene/diene terpolymers and a monomer formulation containing a vinyl halide monomer and at least one long-chain aliphatic vinyl ether copolymerizable with said vinyl halide monomer having 8 to 22 carbon atoms in the aliphatic chain, said monomer formulation comprising at least 70.0 percent by weight of said vinyl halide monomer, 1.0 to 10.0 percent by weight of said long-chain aliphatic vinyl ether and up to 25.0 percent of an ethylenically unsaturated monomer copolymerizable with said vinyl halide monomer, said rubbery olefin polymer being 4.0 to 100.0 percent by weight of said monomer formulation; subjecting said aqueous dispersion to polymerization conditions for a period of time sufficient to polymerize at least a substantial portion of the polymerizable monomers present therein and graft a polymer of vinyl halide and the long-chain aliphatic vinyl monomer onto at least a portion of said rubbery olefin polymer; and recovering the resulting polymeric product.

2. The process of claim 1 wherein a portion of said vinyl halide monomer is introduced into said aqueous dispersion over a period of time during said subjection to polymerization conditions so as to maintain a higher ratio of the long-chain aliphatic vinyl ether to vinyl halide monomer in the aqueous dispersion.

3. The process of claim 1 wherein said vinyl halide monomer is vinyl chloride.

4. The process of claim 1 wherein said vinyl halide and said long-chain aliphatic vinyl ether comprise 100 percent of said monomer formulation.

5. The process of claim 1 wherein said dispersion is a suspension.

6. The process of claim 1 wherein said copolymerizable vinyl ether is cetyl vinyl ether.

7. The process of claim 1 wherein at least two long-chain aliphatic vinyl ethers are employed.

8. The process of claim 1 wherein said monomer formulation includes 5.0 to 25.0 percent by weight of an ethylenically unsaturated monomer copolymerizable with said vinyl halide.

9. The process of claim 1 wherein said vinyl halide is vinyl chloride and comprises at least 80.0 percent by weight of said monomer formulation and wherein a portion of said vinyl chloride is introduced into said aqueous dispersion over a period of time during said subjection to polymerization conditions so as to maintain a higher ratio of long-chain aliphatic vinyl ether to vinyl chloride monomer in the aqueous dispersion.

10. A vinyl halide polymeric product comprising a rubbery olefin polymer selected from the group consisting of polyethylene, chlorinated polyethylene, chlorosulfonated polyethylene, ethylene/vinyl acetate copolymers, ethylene/acrylate copolymers, ethylene/propylene copolymers, ethylene/propylene/diene terpolymers and an interpolymer of at least 70.0 percent by weight of vinyl halide, 1.0 to 10.0 percent by weight of at least one long-chain aliphatic vinyl ether having 8 to 22 carbon atoms in the aliphatic chain and up to 25.0 percent of an ethylenically unsaturated compound copolymerized with said vinyl halide, said rubbery olefin polymer comprising 4.0 to 100.0 percent by weight of said interpolymer and having at least a portion thereof grafted with said interpolymer.

11. The composition of claim 10 wherein said vinyl halide is vinyl chloride.

12. The composition of claim 10 wherein said long-chain aliphatic vinyl ether has 12 to 18 carbon atoms in the aliphatic chain.

13. The composition of claim 10 wherein the interpolymer includes at least two long-chain aliphatic vinyl ethers.

References Cited

UNITED STATES PATENTS

| | | | |
|---|---|---|---|
| 3,074,905 | 1/1963 | Douglas | 260—45.5 |
| 3,157,713 | 11/1964 | Leese | 260—884 |
| 3,268,623 | 8/1966 | Beer | 260—876 |
| 3,290,265 | 12/1966 | Kaneko | 260—29.6 |
| 3,366,709 | 1/1968 | Baer | 260—878 |
| 3,408,424 | 10/1968 | Barkhuff | 260—878 |
| 3,432,576 | 3/1969 | Beer | 260—878 |
| 3,461,188 | 8/1969 | Baer | 260—878 |

JOSEPH L. SCHOFER, Primary Examiner

S. M. LEVIN, Assistant Examiner

U.S. Cl. X.R.

260—41A, 879